(12) United States Patent
Schutzbach

(10) Patent No.: US 11,029,190 B2
(45) Date of Patent: *Jun. 8, 2021

(54) VELOCITY SENSOR WITH PARABOLIC REFLECTOR

(71) Applicant: ADS LLC, Huntsville, AL (US)

(72) Inventor: James S. Schutzbach, Madison, AL (US)

(73) Assignee: ADS LLC, Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/871,230

(22) Filed: May 11, 2020

(65) Prior Publication Data

US 2020/0271505 A1 Aug. 27, 2020

Related U.S. Application Data

(63) Continuation of application No. 15/715,067, filed on Sep. 25, 2017, now Pat. No. 10,648,847.

(60) Provisional application No. 62/399,472, filed on Sep. 25, 2016.

(51) Int. Cl.
*G01F 23/296* (2006.01)
*G10K 11/28* (2006.01)

(52) U.S. Cl.
CPC .......... *G01F 23/2962* (2013.01); *G10K 11/28* (2013.01)

(58) Field of Classification Search
None
See application file for complete search history.

(56) References Cited

U.S. PATENT DOCUMENTS

| | | |
|---|---|---|
| 4,083,246 A | 4/1978 | Marsh |
| 4,116,061 A | 9/1978 | Petroff |
| 4,295,197 A | 10/1981 | Petroff |
| 4,344,329 A | 8/1982 | Petroff |
| 4,386,409 A | 5/1983 | Petroff |
| 4,397,191 A | 8/1983 | Forden |
| 4,407,158 A | 10/1983 | Petroff |
| 4,630,474 A | 12/1986 | Petroff |
| 5,020,374 A | 6/1991 | Petroff et al. |
| 5,198,989 A | 3/1993 | Petroff |
| 5,208,785 A | 5/1993 | Brumley et al. |
| 5,226,328 A | 7/1993 | Petroff et al. |
| 5,315,880 A | 5/1994 | Bailey |
| 5,333,508 A | 8/1994 | Petroff et al. |

(Continued)

OTHER PUBLICATIONS

Jiwani, Riyaz; Lucas, Steffen; "Methods of Flow Measurement," NIVUS GmbH, Feb. 2, 2002.

(Continued)

*Primary Examiner* — Justin N Olamit
(74) *Attorney, Agent, or Firm* — James Richards

(57) ABSTRACT

A velocity sensor and housing therefore, the velocity sensor provides a measurement of the velocity in a sewer manhole or chamber. The velocity sensor includes an ultrasonic transducer that emits a signal to measure the liquid below and may use an additional transducer or it is used by itself to detect the signal reflected from the surface. A parabolic reflector is designed and arranged to direct the emitted ultrasonic signal from the transducer to the surface with a linear beam while minimizing the beam spread. The return echo may either be measured directly or with the same transducer that was used to transmit the ultrasonic signal.

11 Claims, 15 Drawing Sheets

(56) References Cited

U.S. PATENT DOCUMENTS

| | | |
|---|---|---|
| 5,333,614 A | 8/1994 | Feiring |
| 5,371,686 A | 12/1994 | Nabity et al. |
| 5,421,211 A | 6/1995 | Heckman |
| 5,467,650 A | 11/1995 | Cushing |
| 5,473,948 A | 12/1995 | Moss et al. |
| 5,483,499 A | 1/1996 | Brumley et al. |
| 5,615,173 A | 3/1997 | Brumley et al. |
| RE35,535 E | 6/1997 | Brumley et al. |
| 5,684,250 A | 11/1997 | Marsh |
| 5,811,688 A | 9/1998 | Marsh et al. |
| 5,821,427 A | 10/1998 | Byrd |
| 7,165,014 B2 | 1/2007 | Kaneda et al. |
| 7,672,797 B2 | 3/2010 | Petroff |
| 8,215,183 B2 | 7/2012 | Petroff |
| 10,571,315 B2 * | 2/2020 | Rick ................ G01S 15/88 |
| 2011/0239781 A1 | 10/2011 | Petroff |

OTHER PUBLICATIONS

ISO 748:2007, "Hydrometry—Measurement of liquid flow in open channels using current-meters or floats", International Organization for Standarization, Oct. 15, 2007.

\* cited by examiner

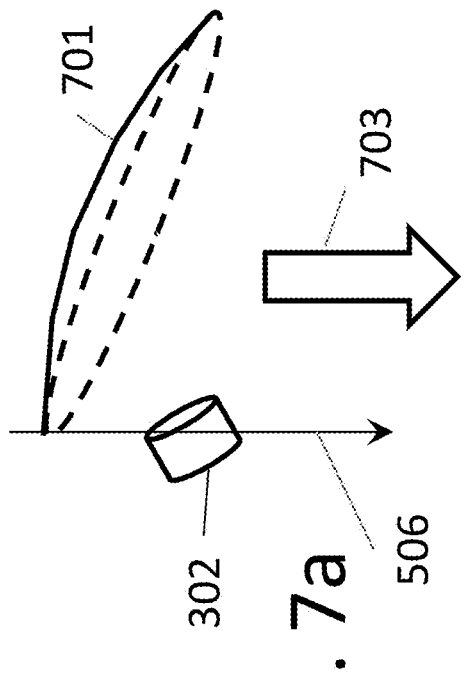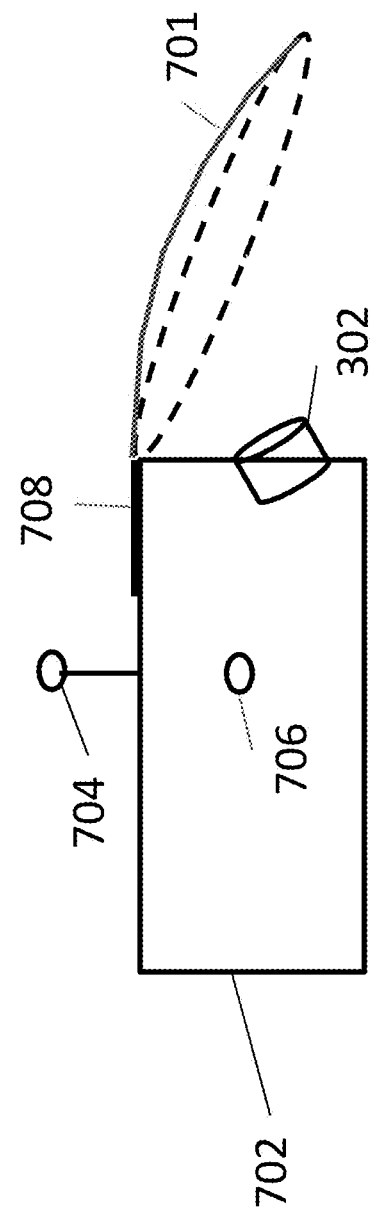

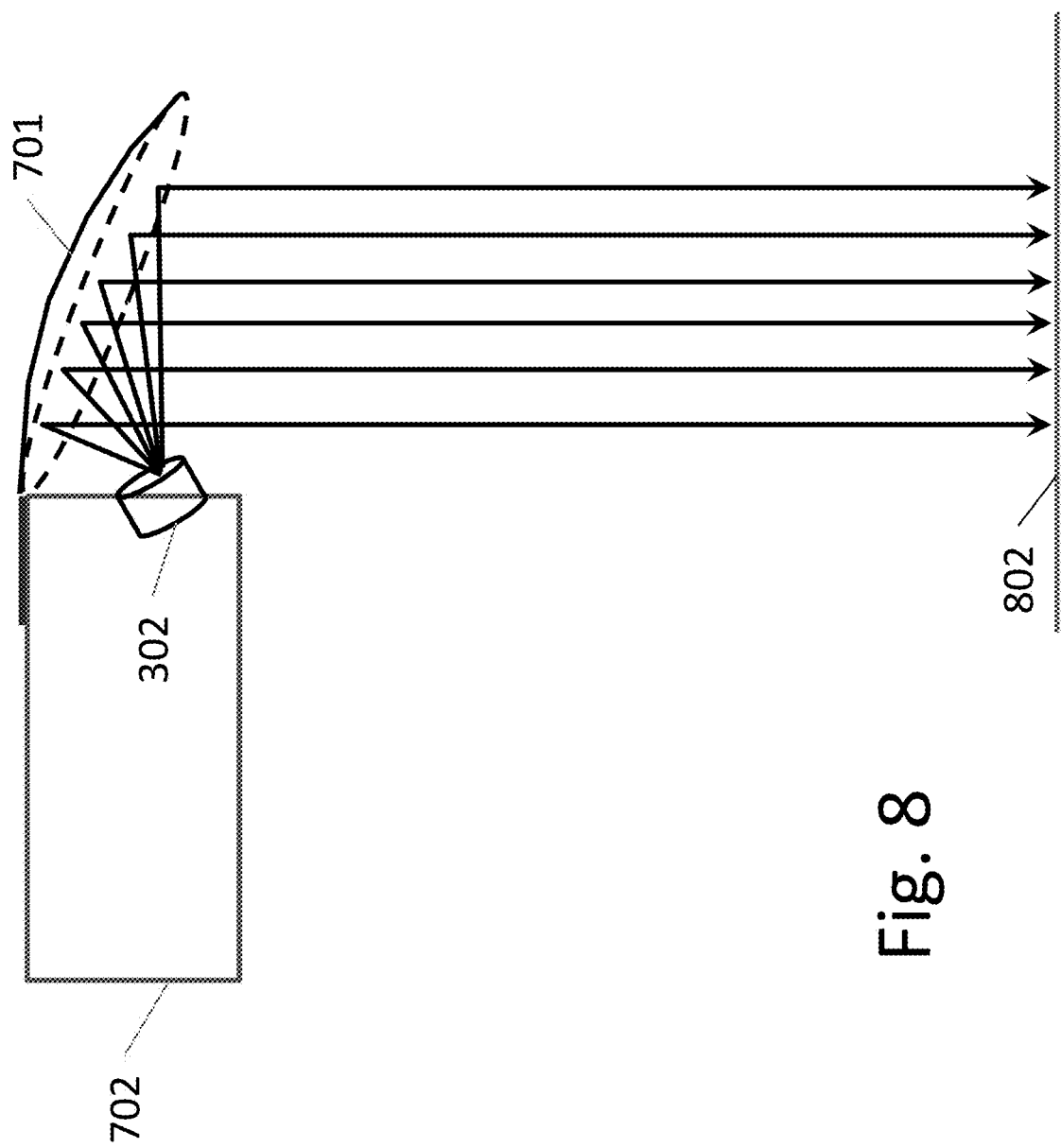

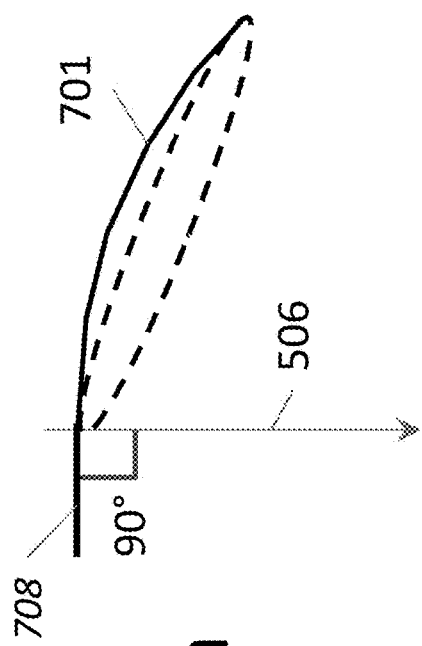
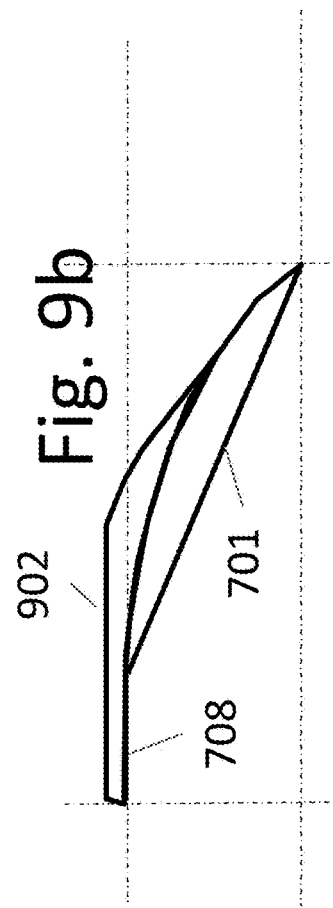
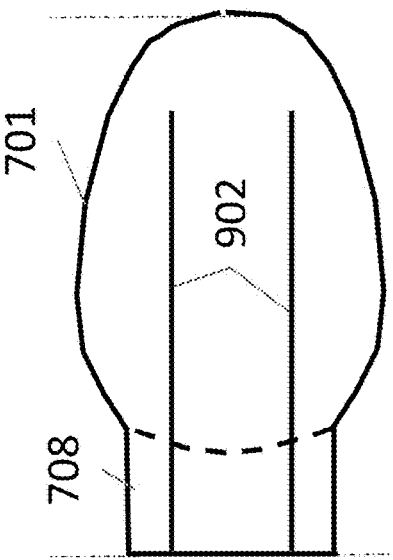
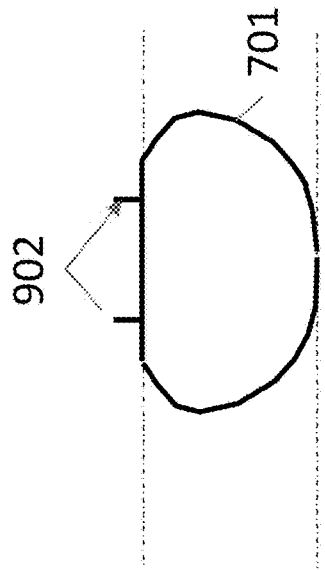

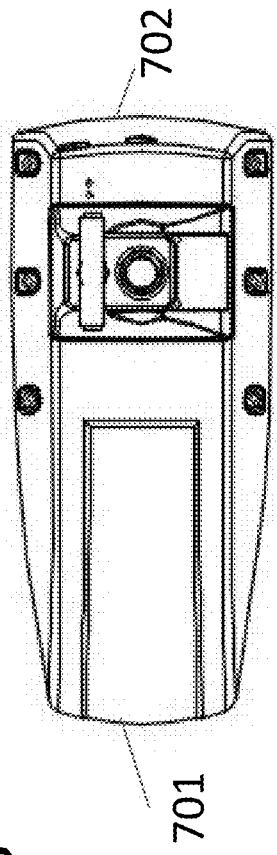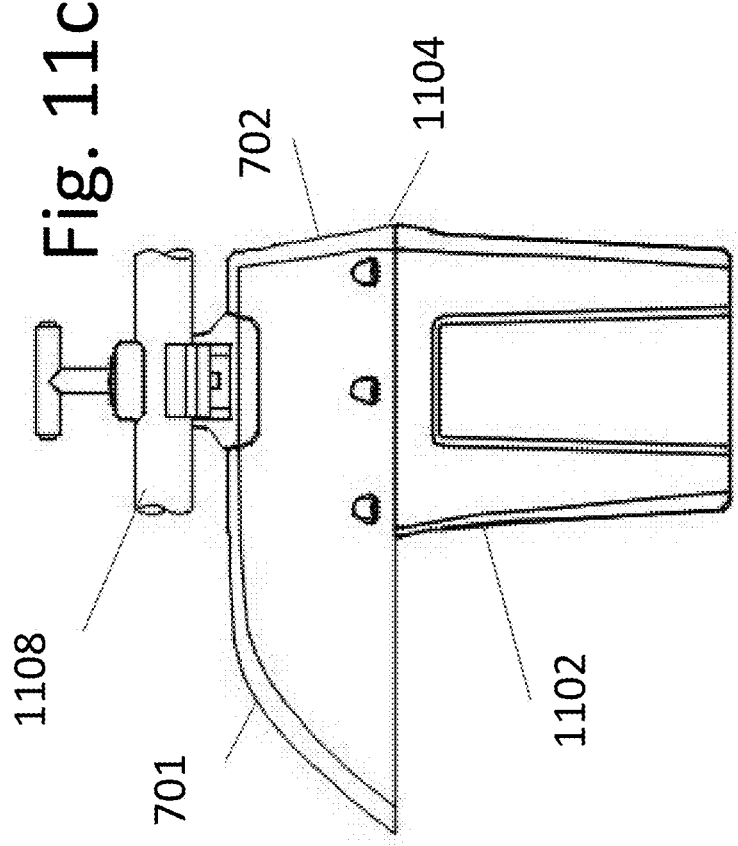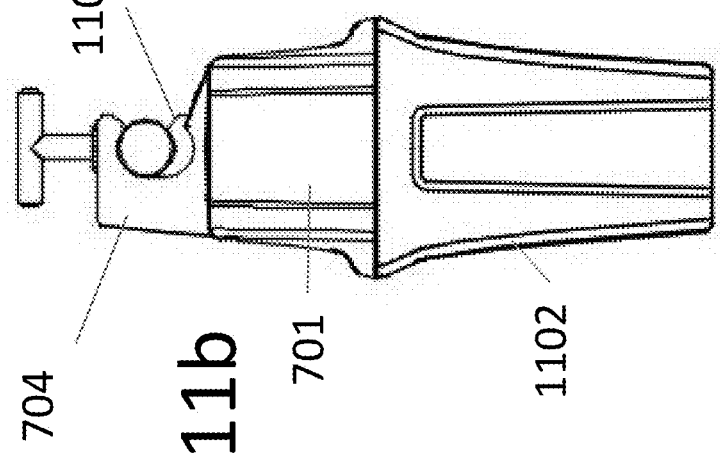

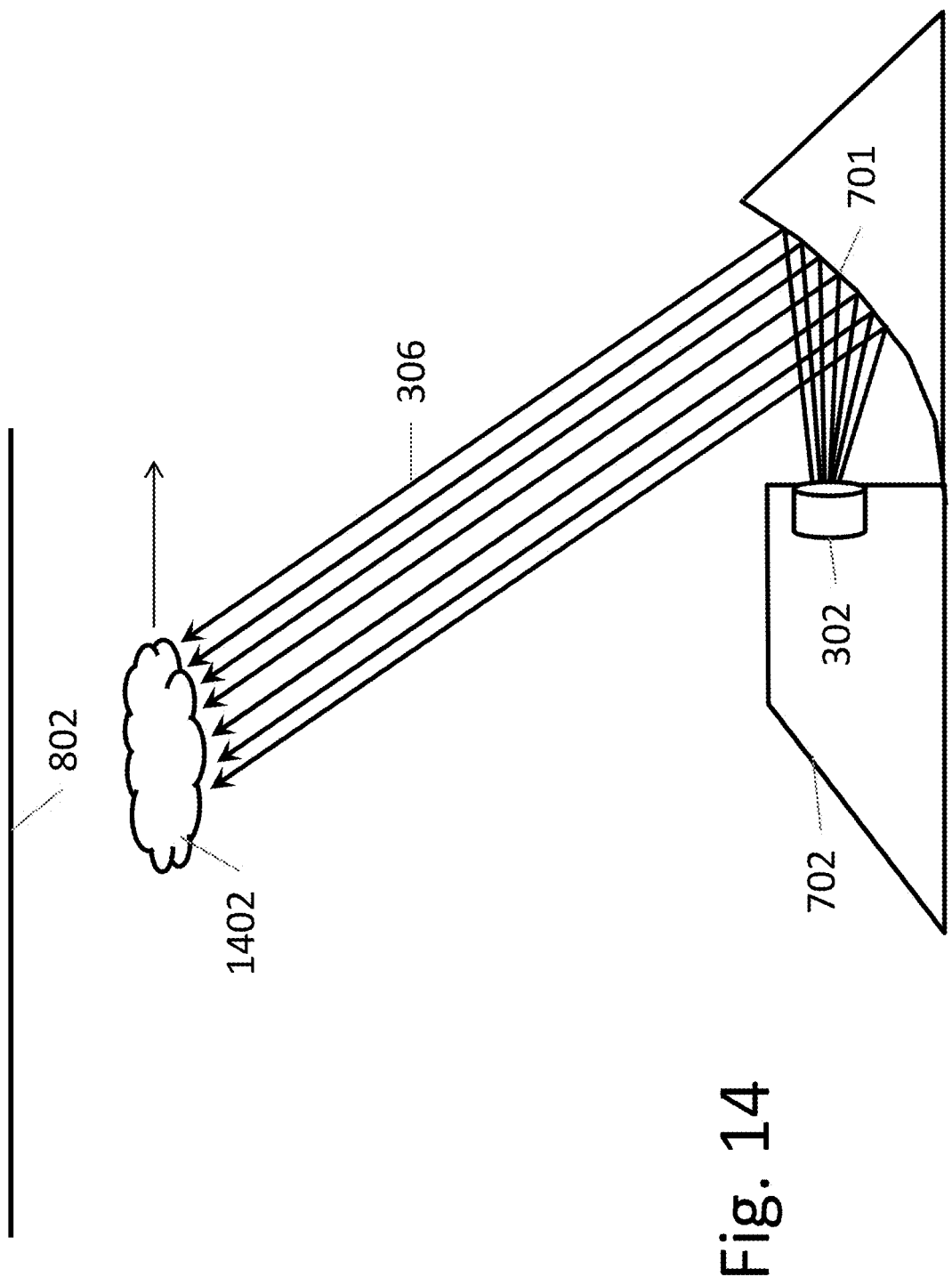

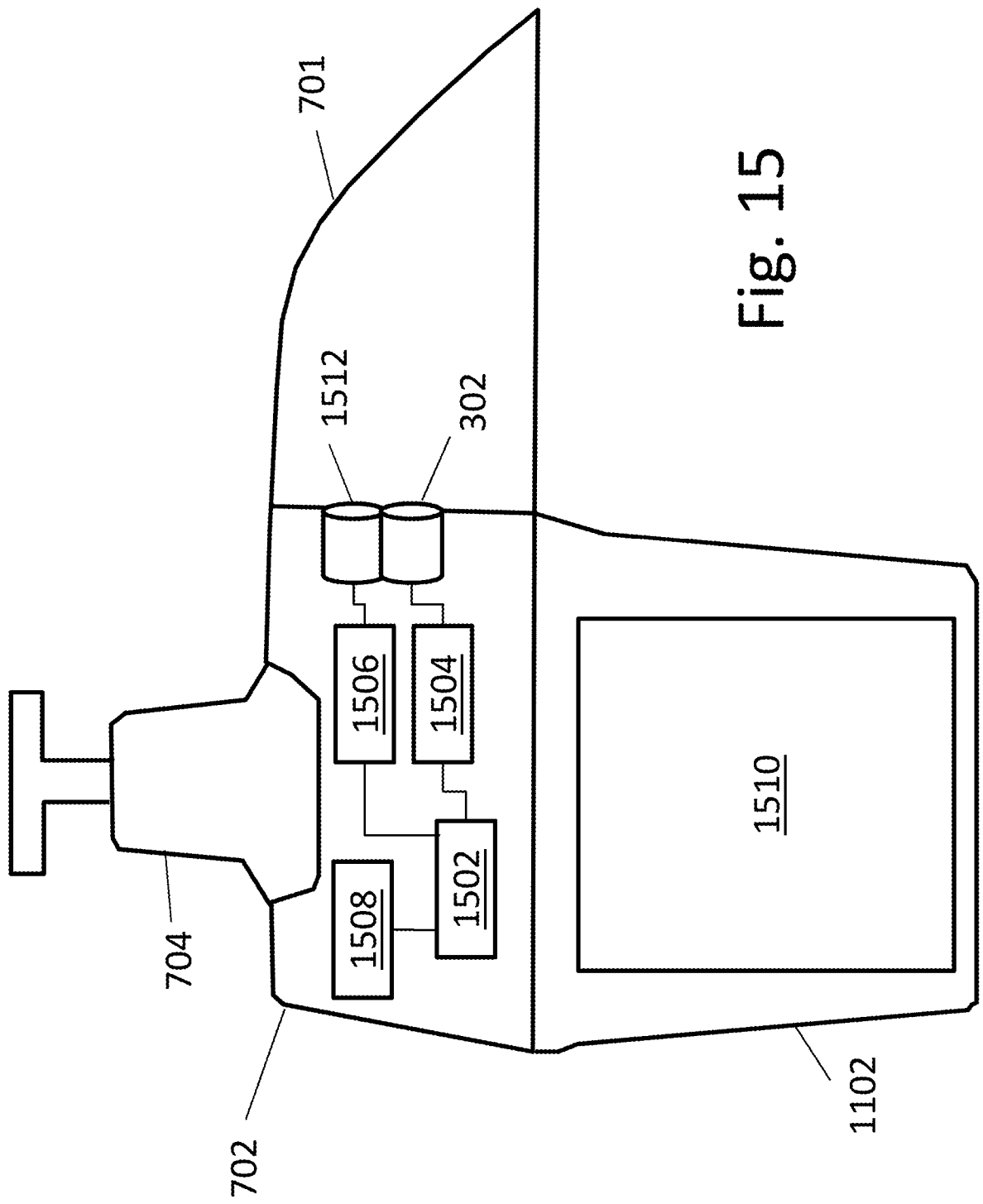

VELOCITY SENSOR WITH PARABOLIC REFLECTOR

RELATED APPLICATIONS

This application is a continuation of U.S. application Ser. No. 15/715,067, titled: "Level Sensor with Parabolic Reflector", filed Sep. 25, 2017 by Schutzbach, which claims the benefit under 35 USC 119(e) of provisional application Ser. No. 62/399,472, titled "Level Sensor with Parabolic Reflector", filed Sep. 25, 2016 by Schutzbach.

All of the above listed US Patent and Patent Applications are hereby incorporated herein by reference in their entirety.

TECHNICAL FIELD

The present invention pertains generally to the field of level and flow sensing of liquids, more particularly to liquid sensing in pipes, containers and spaces, with particular benefits to manholes and other vertical columnar structures.

BACKGROUND

The benefits of monitoring wastewater and storm sewers in cities and broader municipalities is becoming well known and documented. Thus, there is a need for increased monitoring of sewers in existing and expanding municipalities in order to plan and efficiently utilize cities limited resources.

Level monitoring in pipes and sewers offers numerous challenges including varied structures, clutter, condensing and corrosive atmospheres. In particular, ultrasonic sensing in manholes is complicated by varied structures with numerous reflective features including bricks, protrusions, pipes, ladder rungs and other unpredictable features.

Thus, there is a need for low cost, accurate, remote water level monitoring in unattended locations to provide flow data for city planners and real time data for problem and fault detection.

BRIEF DESCRIPTION

The present disclosure pertains generally to a level sensor that provides a measurement of the depth in a sewer manhole or chamber. The level sensor includes an ultrasonic transducer that emits a signal to measure the liquid below and may use an additional transducer or it is used by itself to detect the signal reflected from the surface. An electronic system including a timer is used to measure the time interval between when the emitted signal is sent to the surface below and return echo detection. A parabolic reflector is designed and arranged to direct the emitted ultrasonic signal from the transducer to the surface with a linear beam while minimizing the beam spread. The return echo may either be measure directly or with the same transducer that was used to transmit the ultrasonic signal. The narrow ultrasonic beam with limited spread will allow measuring level in a sewer manhole or confined chamber or any sewer where the level is measured close to a vertical wall.

In general, this disclosure includes:
A liquid level sensor system for operation in vertically confined spaces, comprising:
an ultrasonic transmitter and a first ultrasonic transducer coupled to said ultrasonic transmitter for receiving ultrasonic signals from said ultrasonic transmitter and transmitting said ultrasonic signals acoustically through an air medium;
an ultrasonic receiver configured for receiving reflected ultrasonic signals resulting from said transmitted ultrasonic signals;
a unitary system housing forming a circuit compartment and an off axis parabolic acoustic reflector;
said ultrasonic transmitter and said ultrasonic receiver housed in said circuit compartment in said unitary system housing;
said ultrasonic transducer disposed on a lateral side of said circuit compartment and directed to said off axis parabolic acoustic reflector at a focus producing a downward directed beam from said off axis parabolic reflector.

The liquid level sensor may include:
wherein the ultrasonic receiver is configured to receive said reflected ultrasonic signals through said first ultrasonic transducer, and/or wherein said ultrasonic receiver is configured to receive said reflected ultrasonic signals through a second ultrasonic transducer.

Further, first ultrasonic transducer may be mounted on a side of said electronics housing and said transducer having an active surface facing outward from said electronics housing; wherein said active surface is enclosed on all sides laterally and above, being open only below said active surface.

Further, the off axis parabolic reflector may comprise a parabolic section defined by an intersection of a conical pattern based on a sensing characteristic of said transducer with a paraboloid, said paraboloid having a vertical axis of symmetry and a focus at a center of said transducer.

Further, the conical pattern may have a center axis directed transverse to said vertical axis of symmetry by at least a conical angle from center to edge of said conical pattern.

Further, the parabolic reflector may extend below said transducer and said system further including side walls extending from said electronics housing to said parabolic reflector to enclose said transducer laterally on all sides while remaining open below said transducer. Further, the transducer may be directed with said center peak sensitivity directed upward or horizontally.

This disclosure further includes:
A housing for an ultrasonic level sensor comprising:
a system housing component comprising a processor compartment for housing system circuitry, a parabolic reflector extension extending laterally on one side of said housing compartment, a partition between said processor compartment and said parabolic reflector, said partition configured for mounting a transducer to be directed to said parabolic reflector;
said housing further including a battery compartment container removably attached to an underside of said system compartment;
said housing further including a clamp attached to the top of the processor container for mounting said level sensor on an external mounting feature; said clamp having a first jaw fixedly attached to said processor container and a second jaw adjustable for tightening the claim on the mounting feature; said clamp centered above a center of gravity of said level sensor assembly in operational configuration, including batteries and electronics, for pendulous mounting of said level sensor to establish a desired vertical ultrasonic beam angle for said level sensor; said first jaw of said clamp being an upper jaw configured for hanging said level sensor on said external mounting feature.

The housing component may be fabricated as a single molded part comprising said parabolic reflector, said electronics container, and said first jaw of said clamp.

The housing assembly may further include a seal between said processor container and said battery container sufficient to prevent entry of water into the level sensor interior during operation.

The housing may further include an ultrasonic transducer mounted on a side of said electronics housing and said transducer having an active surface facing outward from said electronics housing; wherein said active surface is enclosed on all sides laterally and above, being open only below said active surface.

The housing may further include an off axis parabolic reflector comprising a parabolic section defined by an intersection of a conical pattern based on a sensing characteristic of said transducer with a paraboloid, said paraboloid having a vertical axis of symmetry and a focus at a center of said transducer.

The conical pattern may have a center axis directed transverse to said vertical axis of symmetry by at least a conical angle from center to edge of said conical pattern.

The parabolic reflector may extend below the transducer and said system further including side walls extending from said electronics housing to said parabolic reflector to enclose said transducer laterally on all sides while remaining open below said transducer.

The transducer may be directed with said center peak sensitivity directed upward or directed horizontally.

These and further benefits and features of the present invention are herein described in detail with reference to exemplary embodiments in accordance with the invention.

BRIEF DESCRIPTION OF THE FIGURES

The present invention is described with reference to the accompanying drawings. In the drawings, like reference numbers indicate identical or functionally similar elements.

Additionally, the left-most digit(s) of a reference number identifies the drawing in which the reference number first appears.

FIG. 7a and FIG. 7b illustrate an exemplary combination including housing geometry.

FIG. 8 illustrates an exemplary completed monitor with housing, transducer, reflector and beam.

FIG. 9a-FIG. 9d illustrate an exemplary brace for support of the paraboloid section and connection of the paraboloid section to the housing.

FIG. 11a-FIG. 11c illustrate an exemplary alternative embodiment of the housing assembly.

FIG. 14 illustrates an underwater variation with a beam angle enabling velocity measurements.

FIG. 15 illustrates exemplary electronics functions contained within the electronics housing.

DETAILED DESCRIPTION

Figure 1:
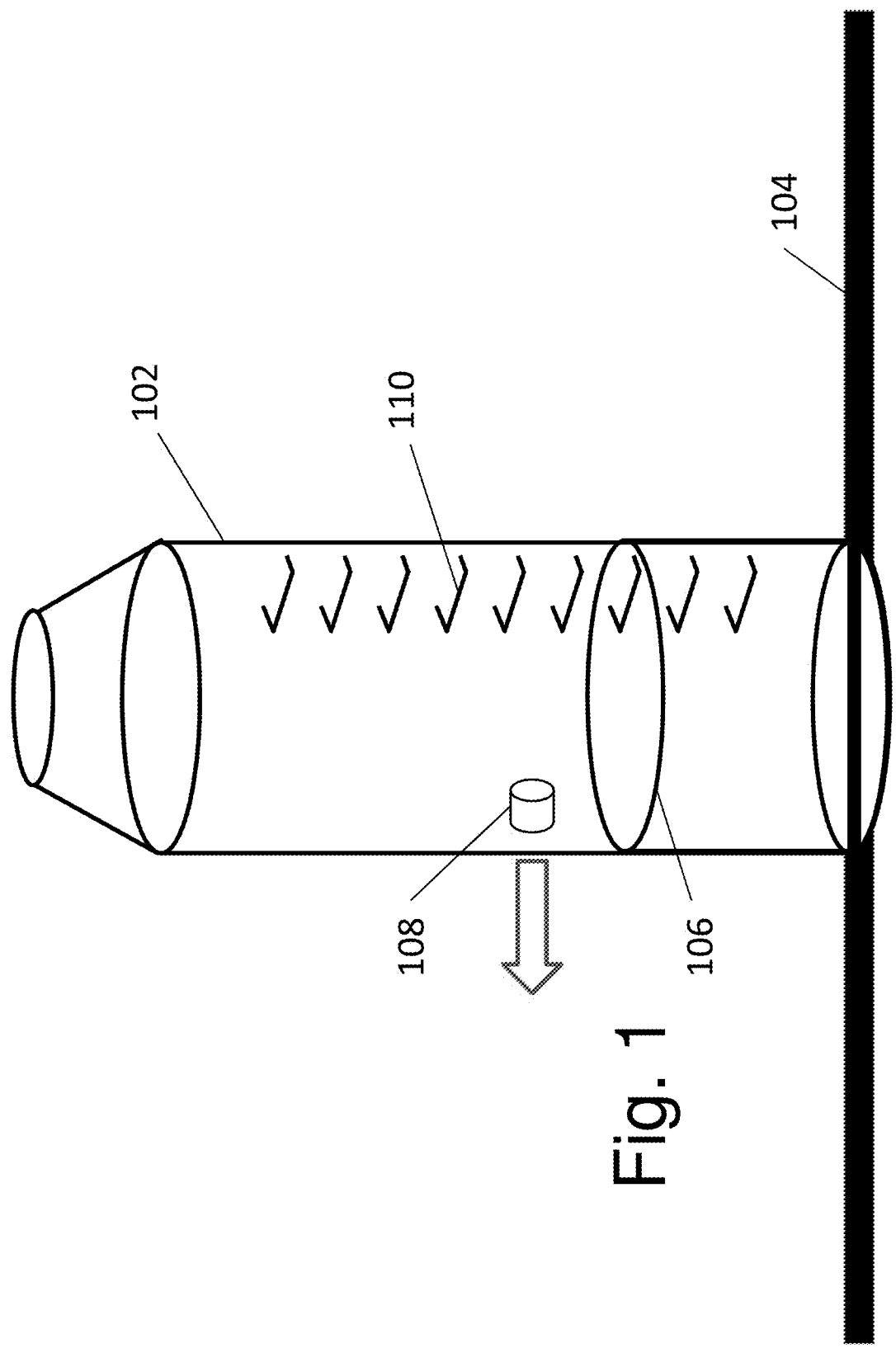
FIG. 1 illustrates an exemplary manhole with sewage backing up.

FIG. 1 illustrates an exemplary manhole with sewage backing up. In a typical sewer system, it is desired to measure water level to detect a backup before an overflow occurs. Thus, crews may be dispatched to find and clear any obstruction or fault causing the overflow. FIG. 1 shows a manhole structure 102, sewer pipe 104, the manhole filled partially with backup water 106 to a level below an overflow pipe 108. A rung type ladder 110 is included.

Figure 2:
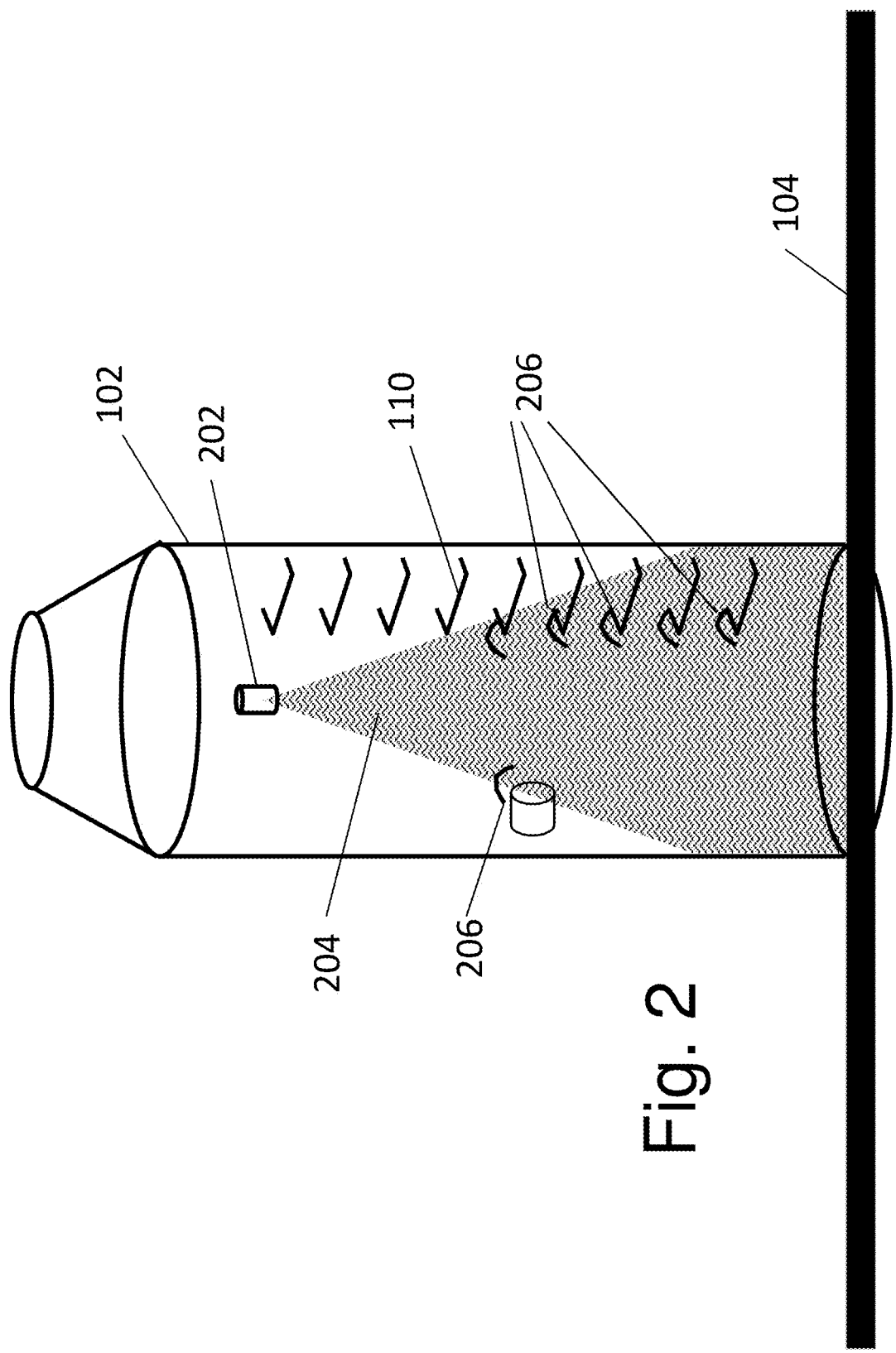
FIG. 2 illustrates the exemplary manhole of FIG. 1 with a wide beam ultrasonic sensor.

FIG. 2 illustrates the exemplary manhole of FIG. 1 with a wide beam ultrasonic sensor. If an ultrasonic transducer 202 is installed in the manhole, even a narrow 10-degree beam 204 is still too wide and tends to pick up stray echoes 206 from objects in the pipe. Stray echoes 206 from ladder rungs or other projections or features may cause false measurements.

Figure 3:
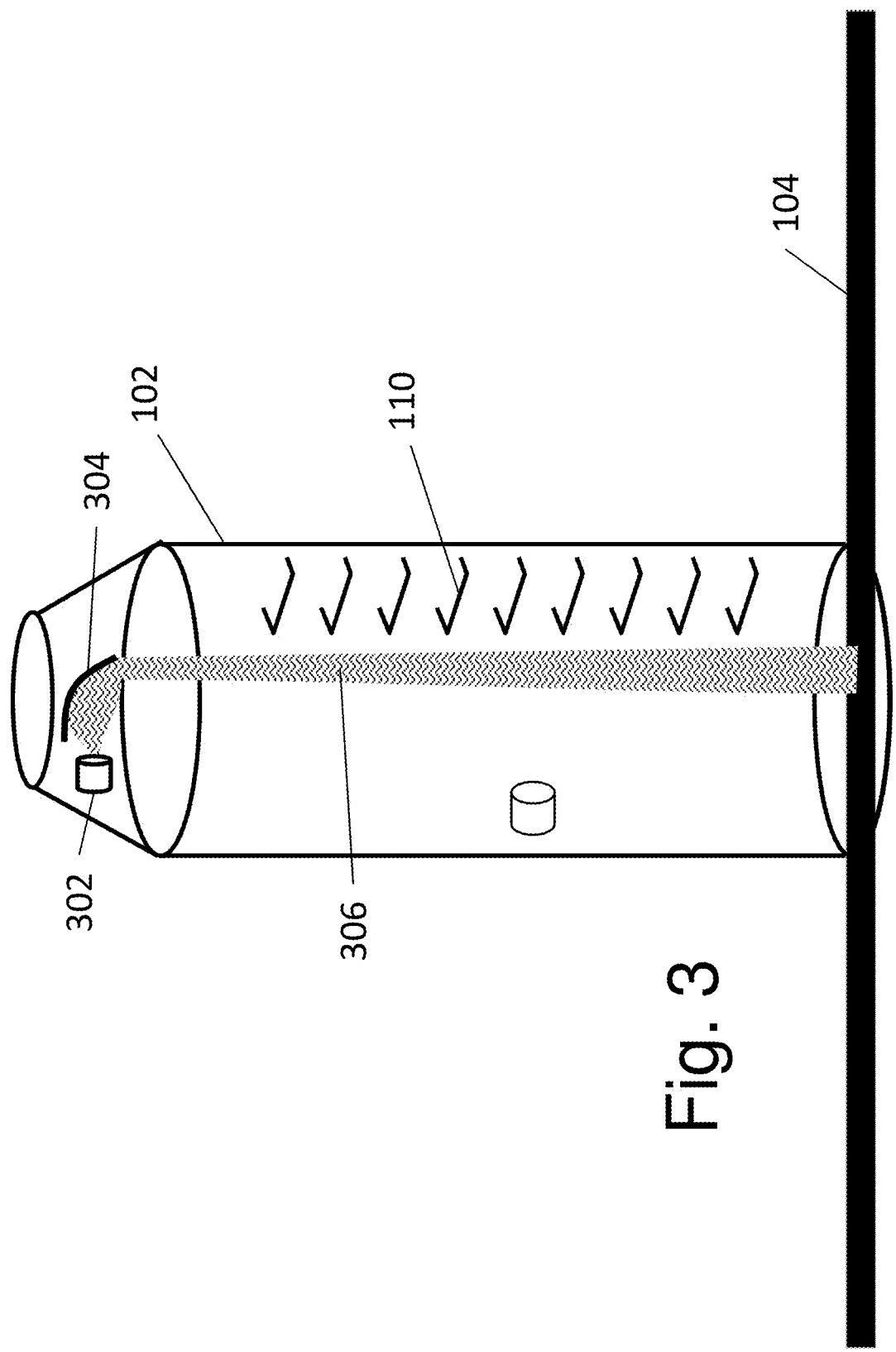
FIG. 3 illustrates the exemplary manhole of FIG. 1 with a narrow beam ultrasonic sensor.

FIG. 3 illustrates the exemplary manhole of FIG. 1 with a narrow beam ultrasonic sensor. FIG. 3 shows a manhole with a level sensor utilizing an ultrasonic transducer 302 directed toward a parabolic reflector 304, producing a narrow beam 306 (narrow spreading angle) directed to the flow at the bottom of the manhole. The narrow beam substantially bypasses the ladder rungs and overflow pipe projection thereby reducing stray reflections that may cause measurement errors. The focused beam may also increase the range of the ultrasonic system. Thus, for example, the system may read into an 8 inch invert from 20 feet away, bypassing reflecting clutter along the way.

Figure 4:
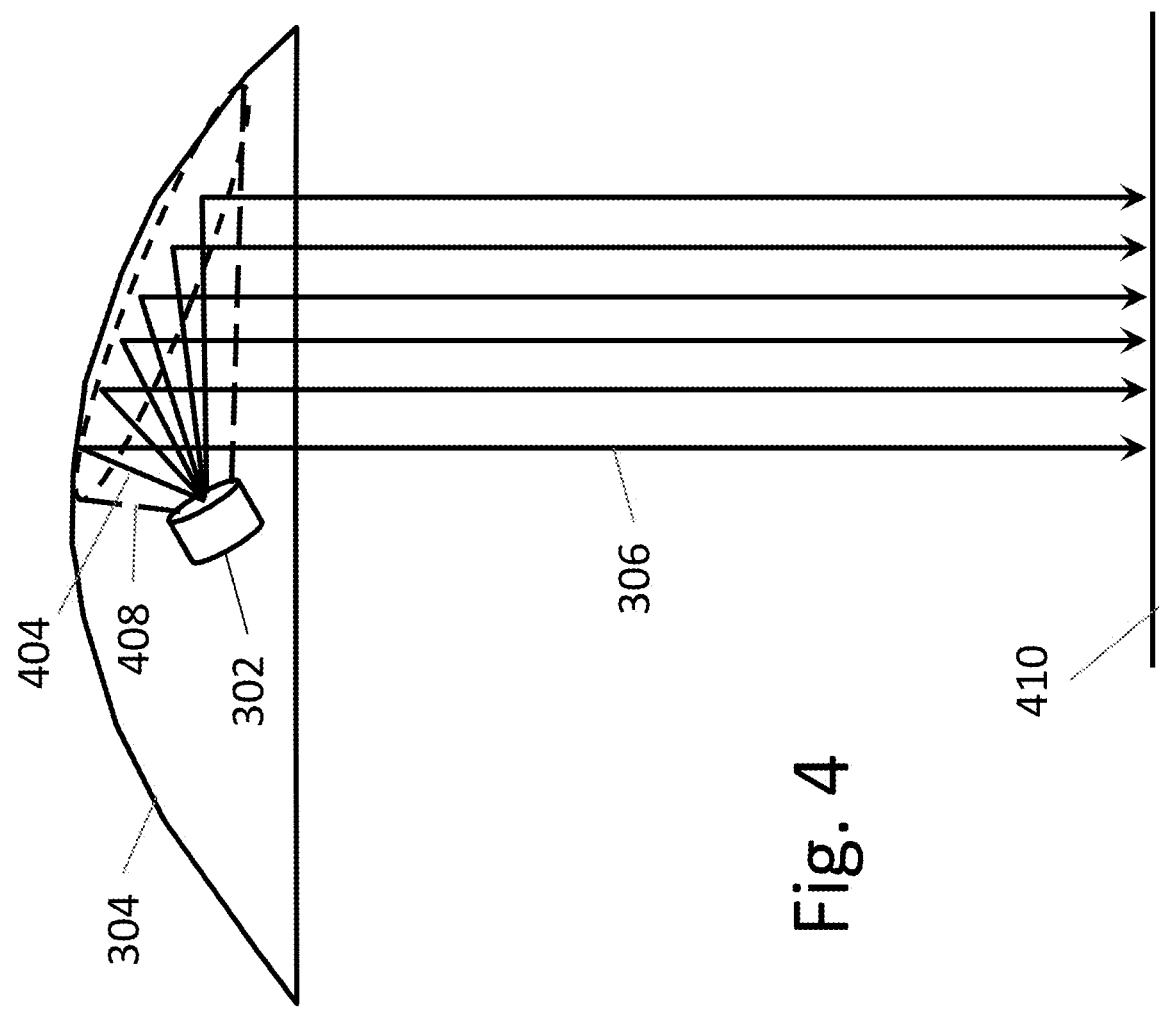
FIG. 4 illustrates an exemplary off axis parabolic reflector with ultrasonic transducer.

FIG. 4 illustrates an exemplary off axis parabolic reflector with ultrasonic transducer. An off axis parabolic reflector may comprise a parabolic section 304 and may be shaped using the intersection of the ultrasonic beam 404 as represented by a cone 408 as shown. The beam 404 from the transducer 302 is shaped by the reflector 304 to form a parallel beam 306 with a flat wave front 410.

The transducer 302 should preferably have a single response lobe with a single center peak response. The energy should be substantially contained within the limits of cone 408. Cone 408 may be defined as a response attenuation from the peak response, for example ten dB down from the peak. The peak response should preferably be the center axial response.

Note that the cone 408 and beams 404 and 306 are approximate depictions for general discussion of the concepts.

Figure 5:
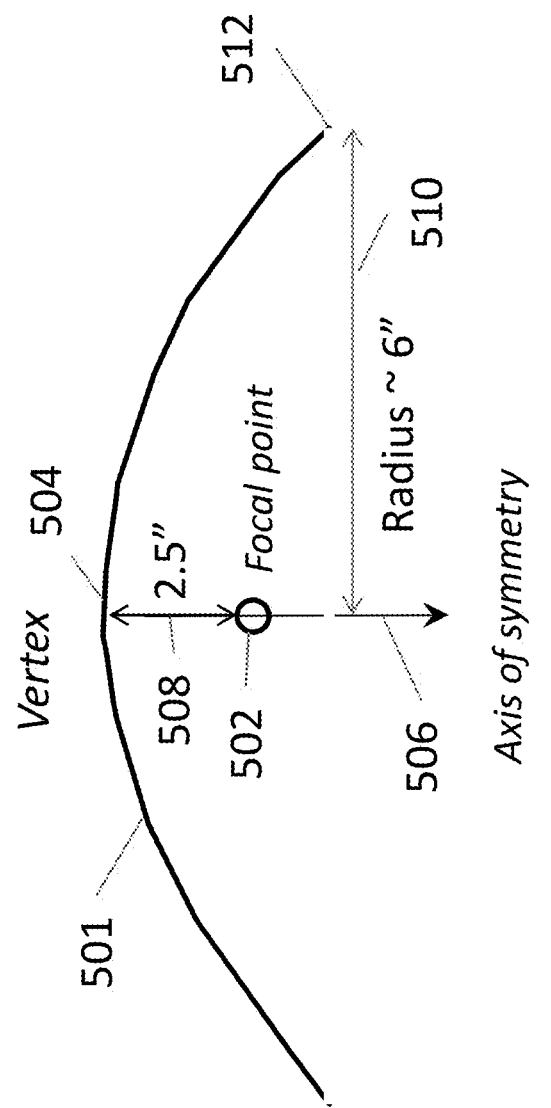
FIG. 5 illustrates parabolic geometry.

FIG. 5 illustrates exemplary parabolic geometry. For example, one may start with a parabola that is aimed down with a focal point 502 that is 2.5 inches (dimension 508) from the vertex 504. An exemplary equation may be:

$$Y = -KX^2$$

Where the X-Y axis is centered at the vertex with X positive in the up direction and Y positive in the right hand direction of the page, and K is a scaling constant, equal to 0.1 for the example shown, which results in a focus at −2.5 inches (−6.4 cm) as shown. The X dimension at the level of the focal point would be 5 inches or 12.6 cm. Preferably the curve may be extended to a termination point 512 below the level of the focal point, or about 3.6 inches as shown resulting in an exemplary lateral dimension 510 of 6 inches (12.25 cm) as shown. In another embodiment, the termination point may be at Y=−6.4 inches and X=8 inches. In general, the parabola graph may be extended as far as necessary to include the transducer radiation cone 408 as described in the step described with reference to FIG. 6.

This planar equation parabola locus may then be rotated about the axis of symmetry 506 to make a paraboloid.

A typical frequency for operation with the exemplary dimensions may be preferably, but not limited to the range from 15 kHz to 100 kHz.

Figure 6:
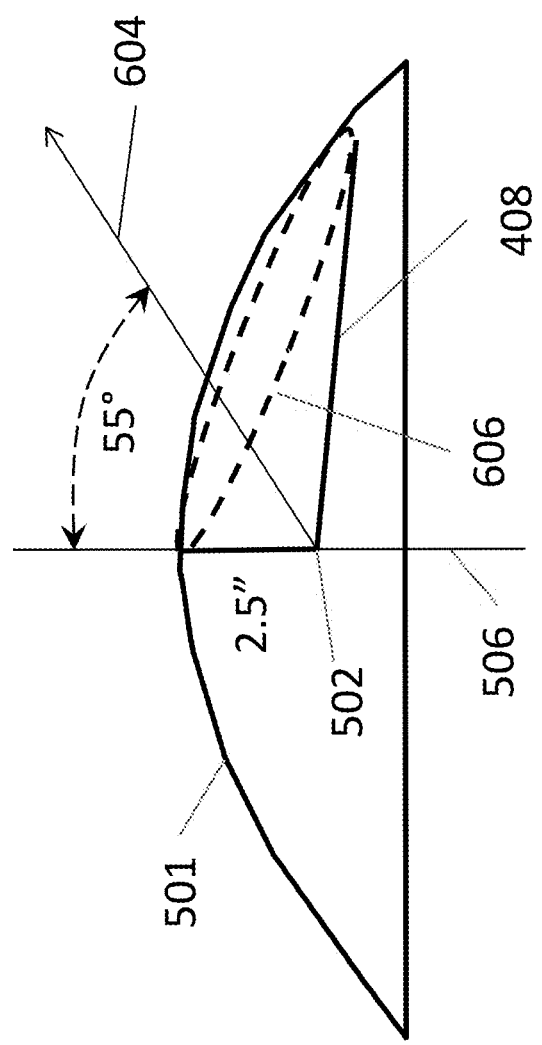
FIG. 6 illustrates the application of parabolic geometry to a preferred variation.

FIG. 6 shows further application of the parabolic geometry to a preferred variation. A transducer radiation pattern cone may be applied to the paraboloid of FIG. 5. The transducer cone may have a center at the peak sensitivity angle of the transducer and lateral edges at a predefined sensitivity point in an angular sensitivity characteristic of the transducer, for example but not limited to, a six dB or ten dB reduction in sensitivity relative to the center peak response. The angle sensitivity would be measured at some far field distance, for example ten or more wavelengths from the transducer. The cone 408 may be added with the cone vertex at the focus 502 of the parabola. The cone may be aimed up at, for example, 55 degrees from vertical. The cone may have a total width of, for example, 110 degrees in accordance with the transducer lateral response limits. (For example, the transducer sensitivity may be 10 dB down 55 degrees from center compared with center sensitivity.) The cone 408 intersects with the paraboloid 402 at the intersection boundary 606 depicted roughly as dashed line. The center angle 604 of the cone corresponds to the center peak response of the transducer. The center angle 604 of the cone may give subjective appearance as off center due to the expanding paraboloid. The left-hand side of the cone is shown parallel to the axis of symmetry 506 of the paraboloid 402. Equivalently, the center of the response beam 604 is directed away from vertical by the center to edge response angle of the transducer.

FIG. 7a and FIG. 7b illustrate an exemplary combination including housing geometry. FIG. 7 illustrates the addition of a flow monitoring housing that provides for the mounting and directing of the transducer, positioning of the reflector, and electronics housing 702 for the sensor electronics, power, communication equipment as well as providing environmental protection for all components. The housing may be balanced for stable single point mounting 704 of the assembly by providing a mounting point 704 above a center of gravity 706 of the assembly, the assembly comprising the electronics housing 702, reflector 701 and any contents including batteries.

The sensor may be connected via the communication equipment to a monitoring station or a network and combined with other sensors to provide comprehensive sensing to a community.

Referring to FIG. 7a and FIG. 6, the parabolic section 701 is found as the interior of the intersection 606 of the transducer emission cone (FIG. 6, ref 408) intersecting with the paraboloid 501. The transducer 302 is positioned at the focus 502 of the paraboloid 501 associated with the direction 703 of the beam. For example, the direction of the beam 703 may be parallel to the axis of symmetry 506 used to generate the paraboloid 501 and section 701.

Referring to FIG. 7b, the transducer 302 and reflector 701 are added to an electronics housing 702 with electronics. A flange 708 may be provided and additional side supports (not shown) may be provided to insure a stable and durable mounting of the reflector 701. In one embodiment, the electronics housing 702 and reflector 701 may be molded together as a single molding.

FIG. 8 illustrates an exemplary completed monitor with housing, transducer, reflector and beam. The final monitor may thus direct the transmit signal to produce a well focused beam having a substantially flat wave front at the surface of the water 802.

FIG. 9a-FIG. 9d illustrate an exemplary brace for support of the paraboloid section and connection of the paraboloid section to the housing. FIG. 9a shows the geometry of the parabolic reflector 701 extracted from FIG. 8. The exemplary mounting flange 708 is shown ninety 90 degrees from the axis of symmetry 506. FIG. 9b illustrates more physical details of an exemplary implementation of the geometry of FIG. 9a. FIG. 9b shows a reflector plate 701 with an underside surface conformal to the paraboloid developed in FIG. 4 through FIG. 8 with an outer rim defined by the transducer cone of FIG. 6 intersecting the paraboloid. An exemplary support brace 902 is added to the top in the form of ribs extend to the mounting flange 708 horizontally. FIG. 9c is an end view of the reflector of FIG. 9b, looking at the reflector face of the reflector. Note the added brace 902 forms ribs running along the top of the reflector. FIG. 9d is a top view of the reflector of FIG. 9b, showing the mounting flange 708 and ribs of brace 902.

Figure 10:
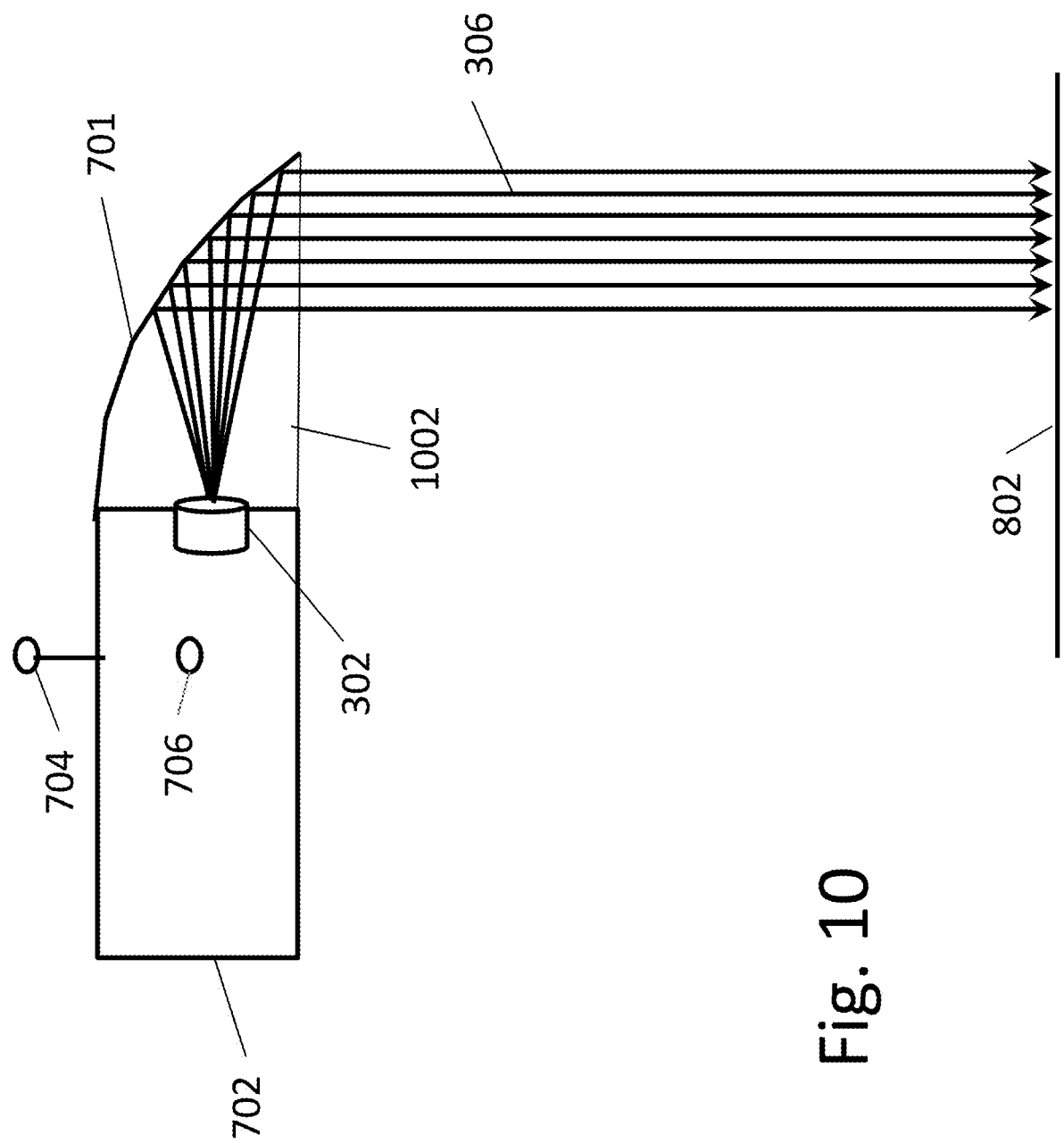
FIG. 10 illustrates an exemplary completed monitor with a 90-degree reflected and directed beam.

FIG. 10 illustrates an exemplary completed monitor with a 90 degree reflected and directed beam. FIG. 10 shows a variation having an ultrasonic transducer 302 directed horizontally (for example the center of the transducer axis and beam is directed 90 degrees from vertical) and a parabolic reflector 304 designed to reflect the beam 90 degrees to result in a vertical beam 306. Side walls 1002 may be added front and back, in the view shown, to further enclose and protect the transducer 302. The transducer is mounted on one side of the sensor electronics housing and the parabolic reflector projects from the housing and extends below the ultrasonic transducer, thereby enclosing the transducer within a space defined by the parabolic reflector section, the housing and side walls. The enclosed space (enclosed on all sides except the bottom) being open at the bottom for the ultrasonic beam 306.

FIG. 11a-FIG. 11c illustrate an exemplary alternative embodiment of the housing assembly. FIG. 11c shows a side view of a level sensor in accordance with this disclosure, in particular showing details of an exemplary housing configuration with a lower housing 1102. The lower housing may preferably house a battery; however, the upper housing and lower housing may together house the electronics including transmitter, receiver, processor, communications, and other sensors and associated circuitry. As shown the parabolic reflector 701 and electronics housing 702 are combined as a single molding. The upper housing and lower housing may be assembled with a seal 1104 comprising an O-ring or custom gasket or other seal means to prevent entry of water and/or contaminants. The upper housing may include a portion of an attachment. A first jaw of a clamp 704 is shown molded with the upper housing. The second jaw 1106 is assembled with the upper housing 702 and is shown clamping to an exemplary pipe 1108 in the environment, the pipe not being part of the invention.

Figure 12:
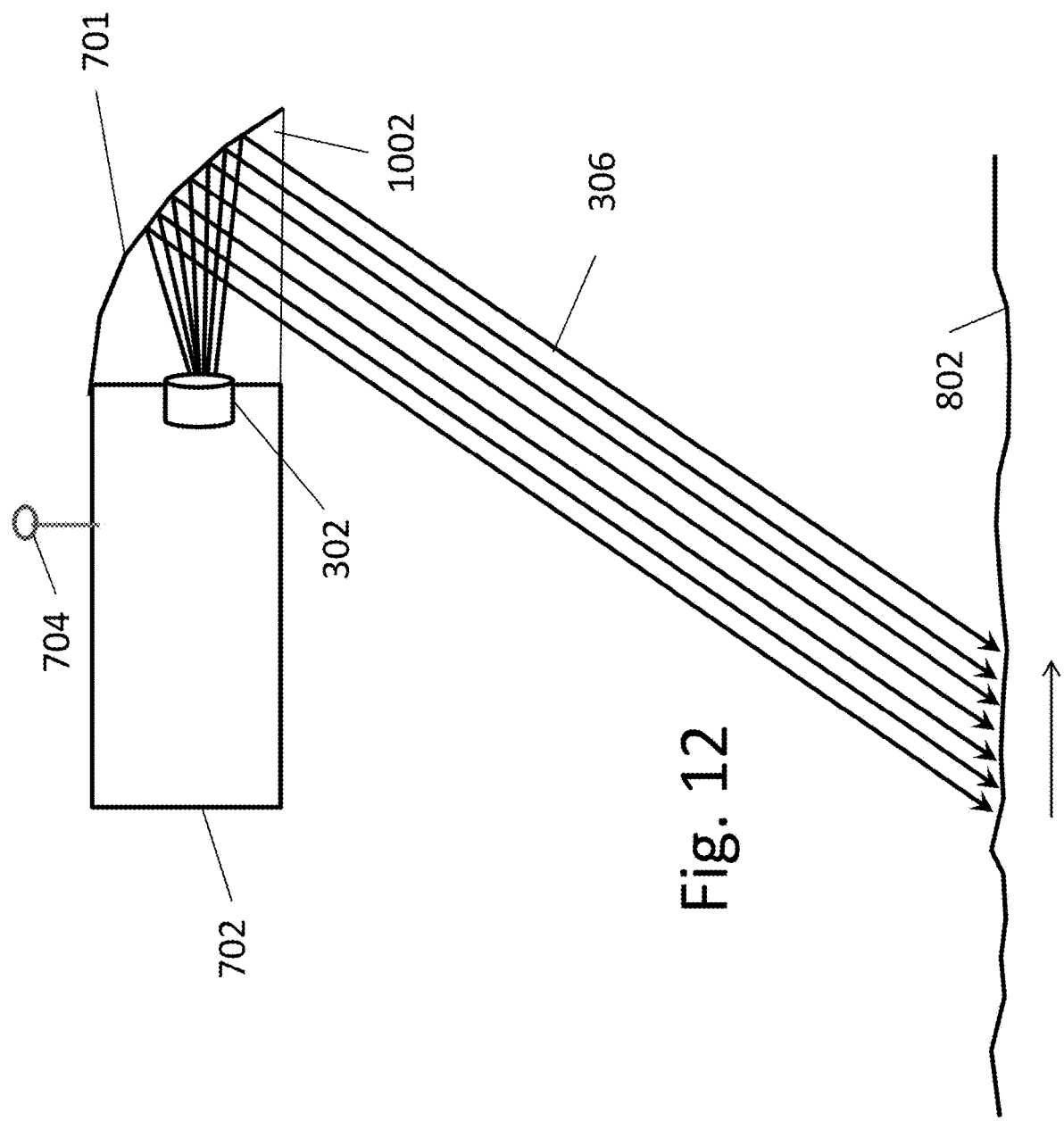
FIG. 12 illustrates an alternative beam angle for enabling flow velocity measurements.

FIG. 12 illustrates an alternative beam angle for enabling flow velocity measurements. As shown, the angle of the beam 306 is not perpendicular to the surface of the water 802 to enable measurement of velocity by processing Doppler signals or delay signals in the return reflections.

Figure 13:
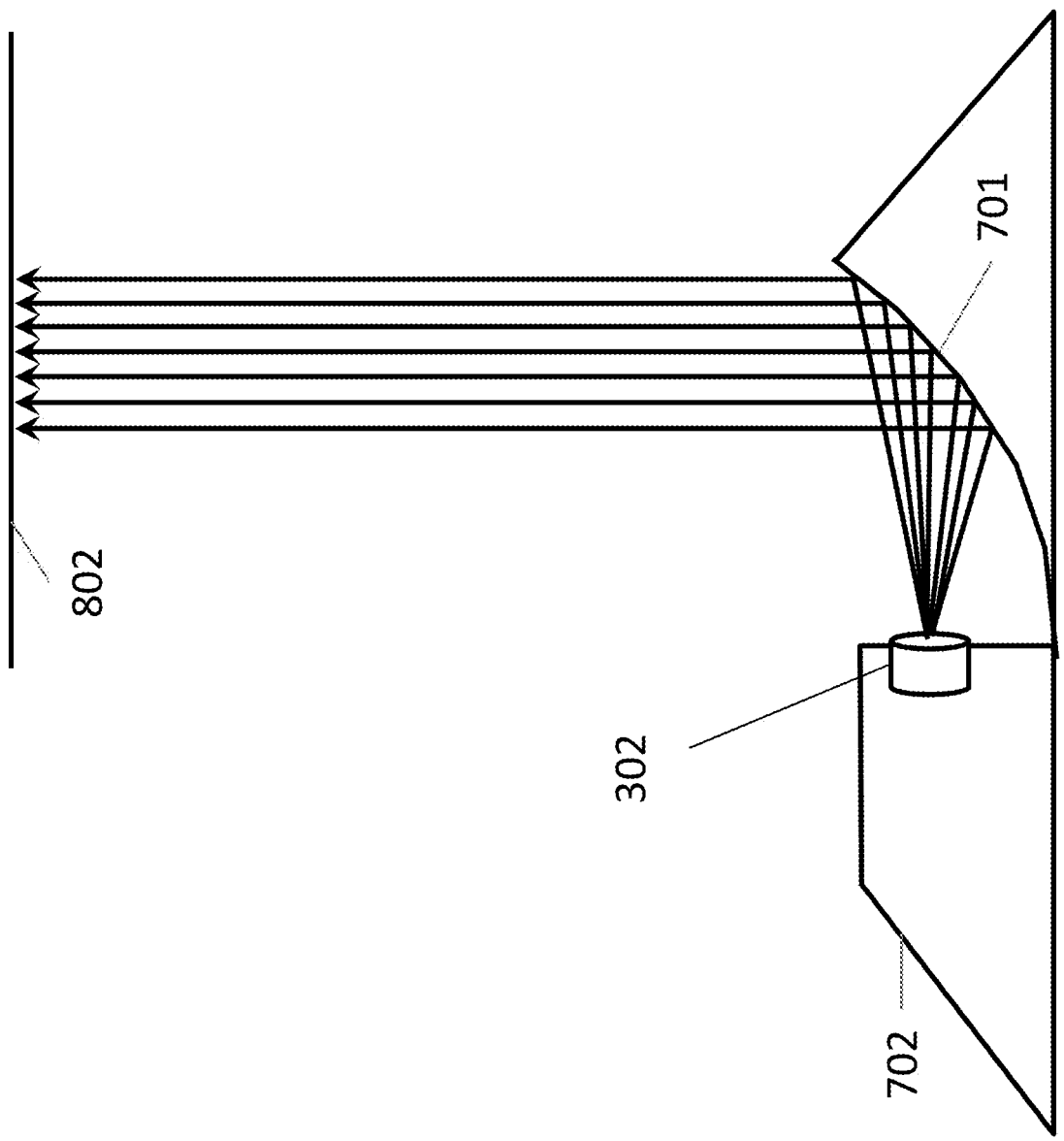
FIG. 13 illustrates an underwater variation.

FIG. 13 illustrates an underwater variation. In FIG. 13, the transducer 302 and electronics 702 are under water. The reflector 701 reflects the signal upward to the surface of the water 802 to determine the depth (alternatively referred to as the level) of the water.

FIG. 14 illustrates an underwater variation with a beam angle enabling velocity measurements. The system may have a parabolic reflector with the beam not perpendicular to the motion of a fluid to direct the transmit signal at an acute angle relative to the flow to be used for measuring the velocity of the fluid by measuring the velocity of objects 1402 or voids (bubbles) in the fluid.

FIG. 15 illustrates exemplary electronics functions contained within the electronics housing 702. The exemplary electronics system may include a transmitter 1504, receiver 1506, processor 1502 and communications equipment 1508. The communications may be wireless or wired as desired. Additional sensors and transducers may be provided as desired. The exemplary transducer is shown divided into two transducers for transmit and receive. Alternatively, a single transducer may be used for both transmit and receive. The battery housing 1102 is shown with a battery 1510 for powering the electronics shown above. Optionally, chargers and regulators may also be included.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A liquid velocity sensor system, comprising:
an ultrasonic transmitter and a first ultrasonic transducer coupled to said ultrasonic transmitter for transmitting ultrasonic signals acoustically through an air medium;
an ultrasonic receiver configured for receiving reflected ultrasonic signals resulting from said transmitted ultrasonic signals;
a unitary system housing forming a circuit compartment and a parabolic acoustic reflector;
said ultrasonic transmitter and said ultrasonic receiver housed in said circuit compartment in said unitary system housing;
said first ultrasonic transducer disposed on a lateral side of said circuit compartment and directed to said parabolic acoustic reflector at a focus producing a diagonally directed beam from said parabolic acoustic reflector;
wherein said parabolic acoustic reflector comprises an outer edge of said unitary system housing, said outer edge defined by an intersection of a conical pattern with a paraboloid, said conical pattern having a vertex at said first ultrasonic transducer and a conical angle from center to edge of the cone, based on a sensing characteristic of said first ultrasonic transducer, said paraboloid having an axis of symmetry directed in a desired beam direction and a focus at a center of said first ultrasonic transducer.

2. The liquid velocity sensor system as recited in claim 1, wherein said ultrasonic receiver is configured to receive said reflected ultrasonic signals through said first ultrasonic transducer.

3. The liquid velocity sensor system as recited in claim 1, wherein said ultrasonic receiver is configured to receive said reflected ultrasonic signals through a second ultrasonic transducer.

4. The liquid velocity sensor system as recited in claim 1, wherein said first ultrasonic transducer is mounted on a side of said circuit compartment and said first ultrasonic transducer having an active surface facing outward from said circuit compartment; wherein said active surface is enclosed laterally and above said active surface, being open below said active surface.

5. The liquid velocity sensor system as recited in claim 1, wherein said first ultrasonic transducer having a center peak sensitivity, wherein said first ultrasonic transducer is directed with said center peak sensitivity directed upward.

6. The liquid velocity sensor system as recited in claim 1, wherein said first ultrasonic transducer having a center peak sensitivity, wherein said first ultrasonic transducer is directed with said center peak sensitivity directed horizontally toward said parabolic reflector.

7. The liquid velocity sensor system as recited in claim 1, wherein said conical pattern has a center axis directed transverse to said axis of symmetry by at least a conical angle from center to edge of said conical pattern.

8. The liquid velocity sensor system as recited in claim 7, wherein said parabolic reflector extends below said first ultrasonic transducer and said system further including side walls extending from said circuit compartment to said parabolic reflector to enclose said first ultrasonic transducer laterally while being open below said first ultrasonic transducer.

9. The liquid velocity sensor system as recited in claim 7, wherein said conical angle of said conical pattern is based on a predetermined response value of said transducer relative to a center peak response.

10. The liquid velocity sensor system as recited in claim 9, wherein the parabolic section is disposed entirely on one side of the paraboloid axis of symmetry.

11. The liquid velocity sensor system as recited in claim 10, wherein said predetermined response value is 10 dB reduced from said center peak response.

* * * * *